Aug. 7, 1962 L. W. BARNES 3,048,199
VERTICAL FOUR SLIDE WIRE OR RIBBON METAL FORMING MACHINE
Filed March 29, 1956 12 Sheets-Sheet 1
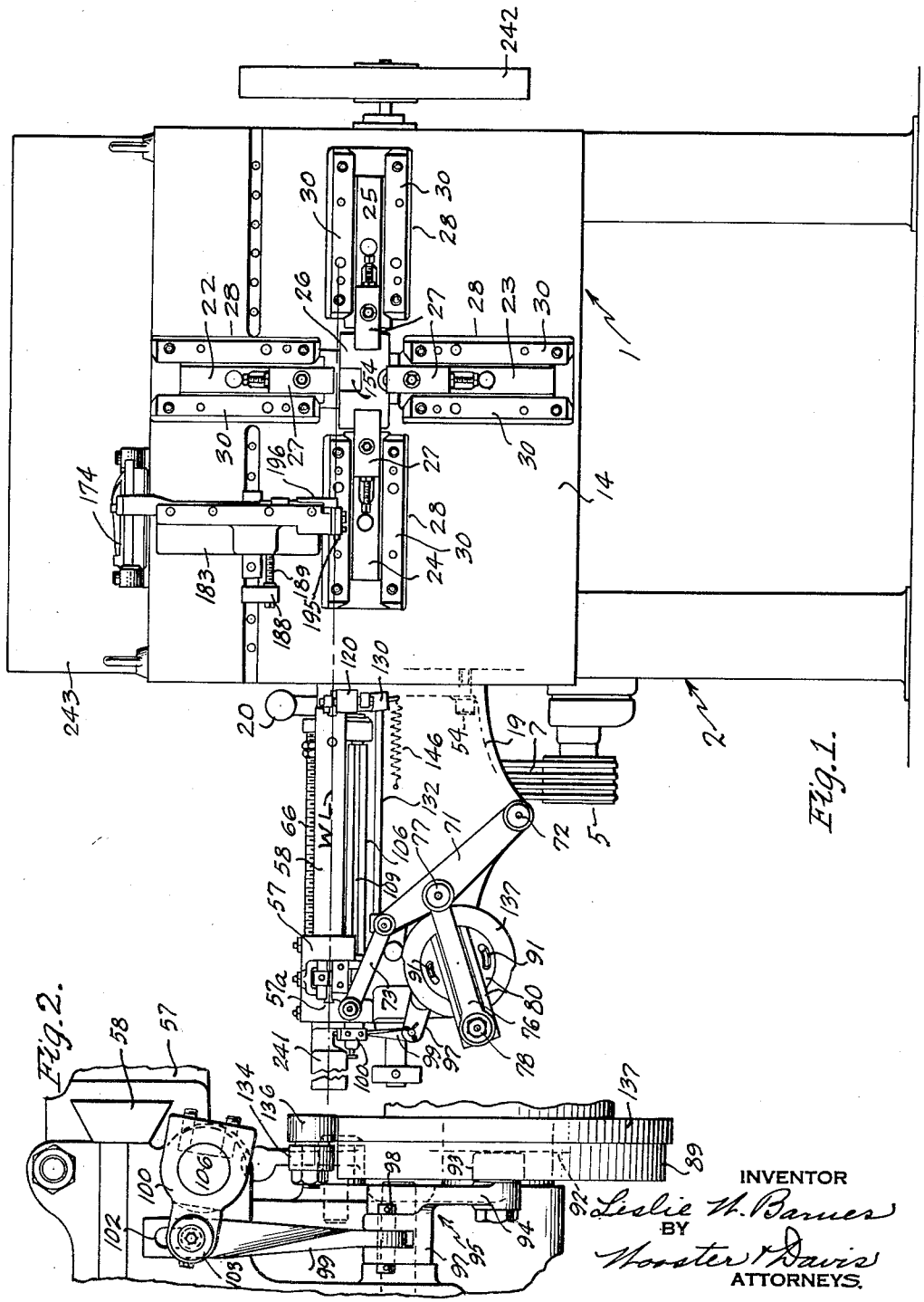
INVENTOR
Leslie W. Barnes
BY
Wooster & Davis
ATTORNEYS.

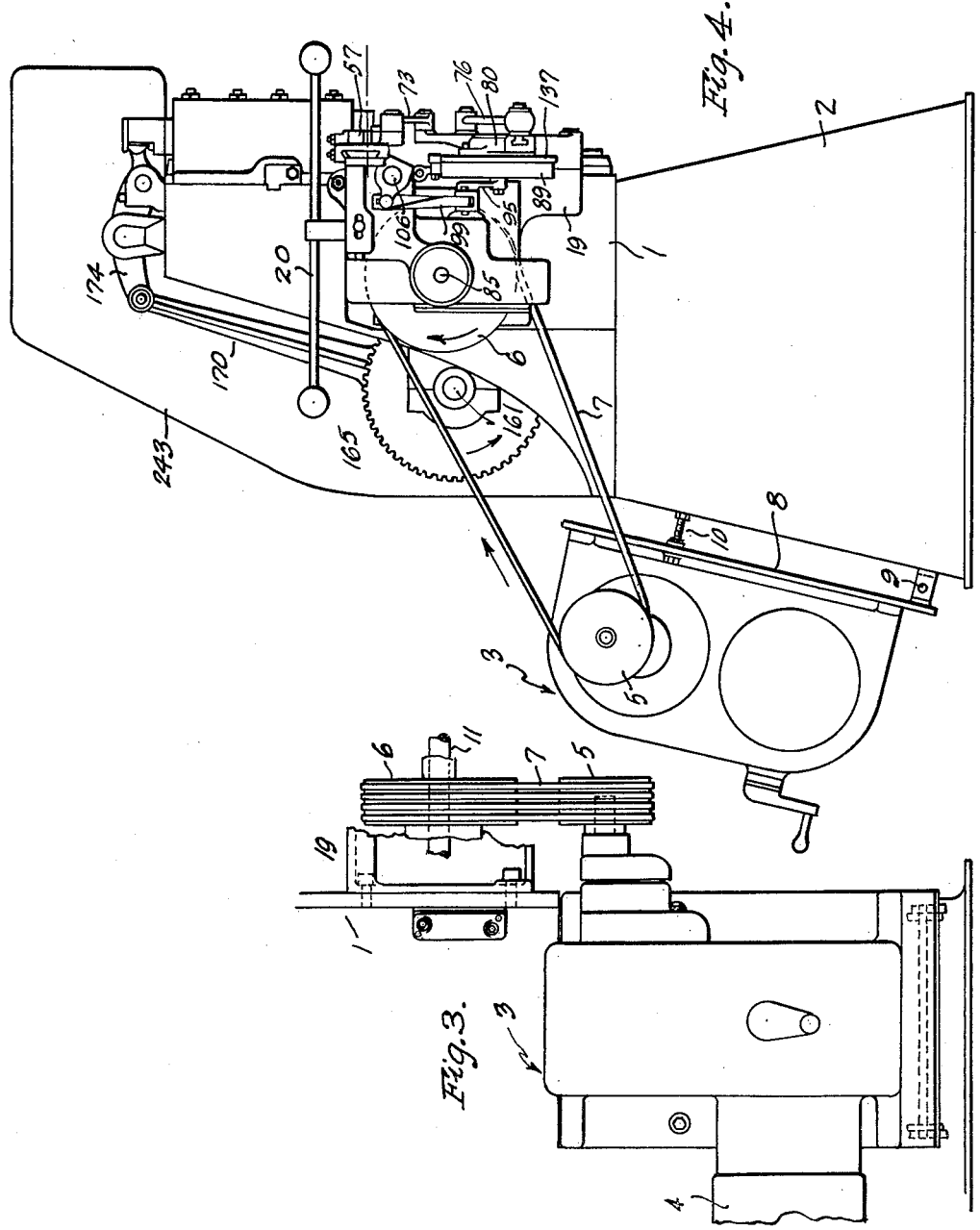

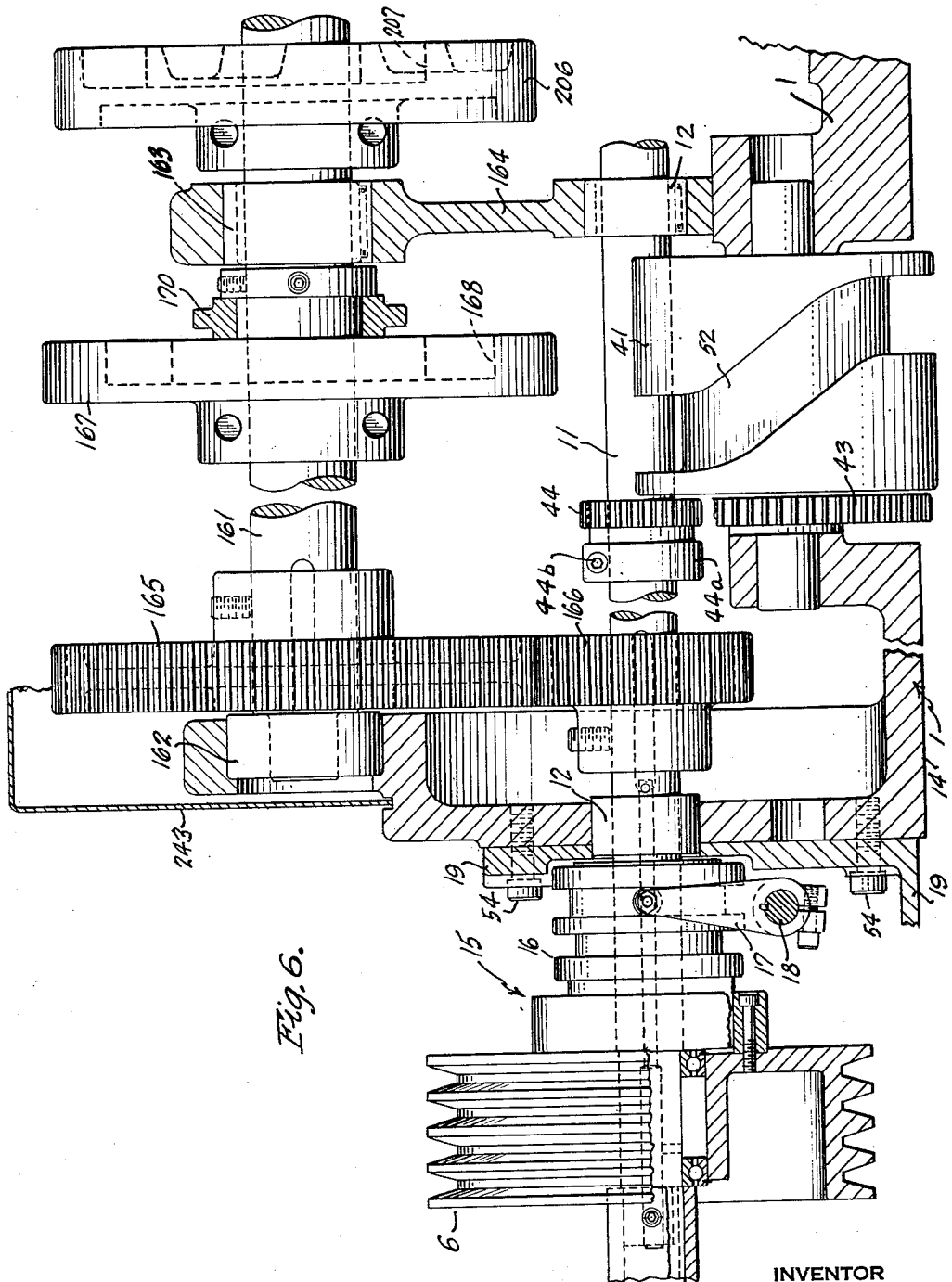

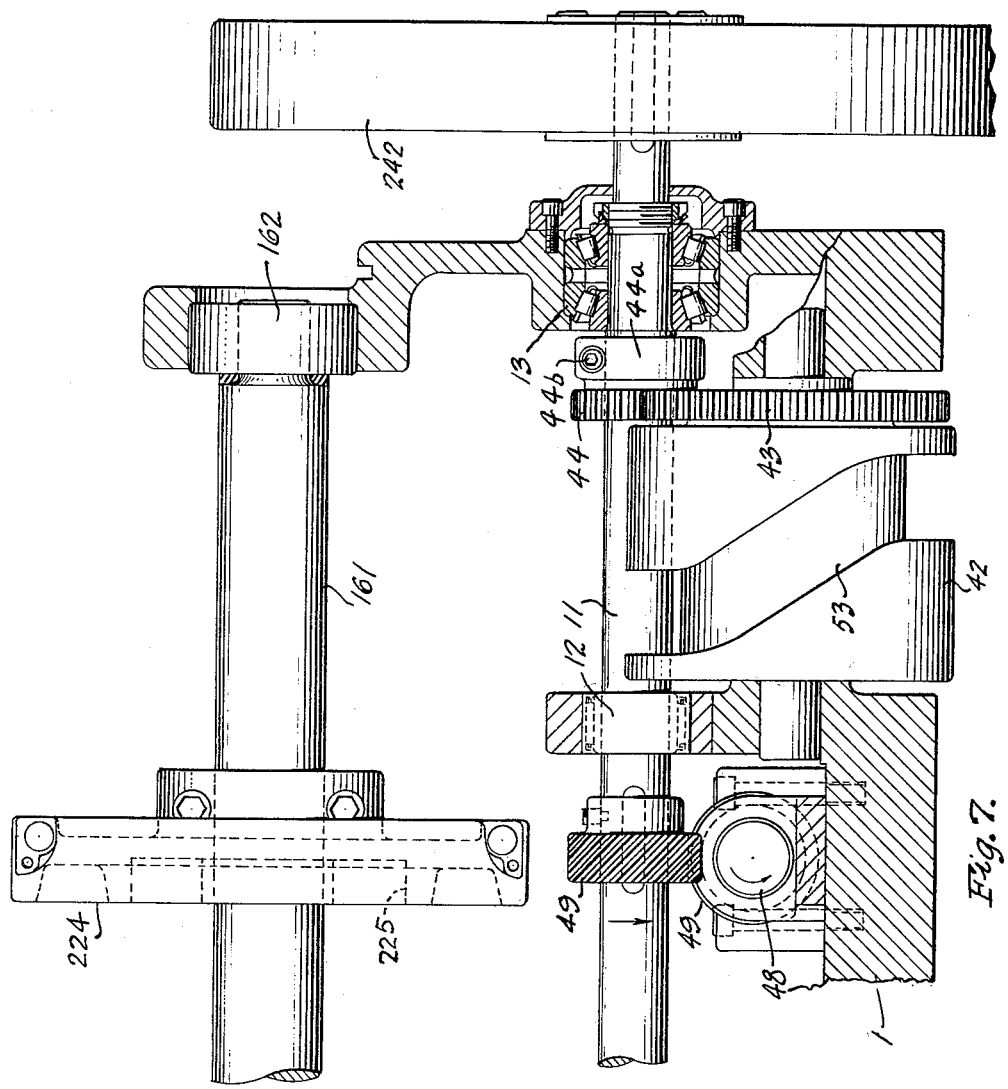

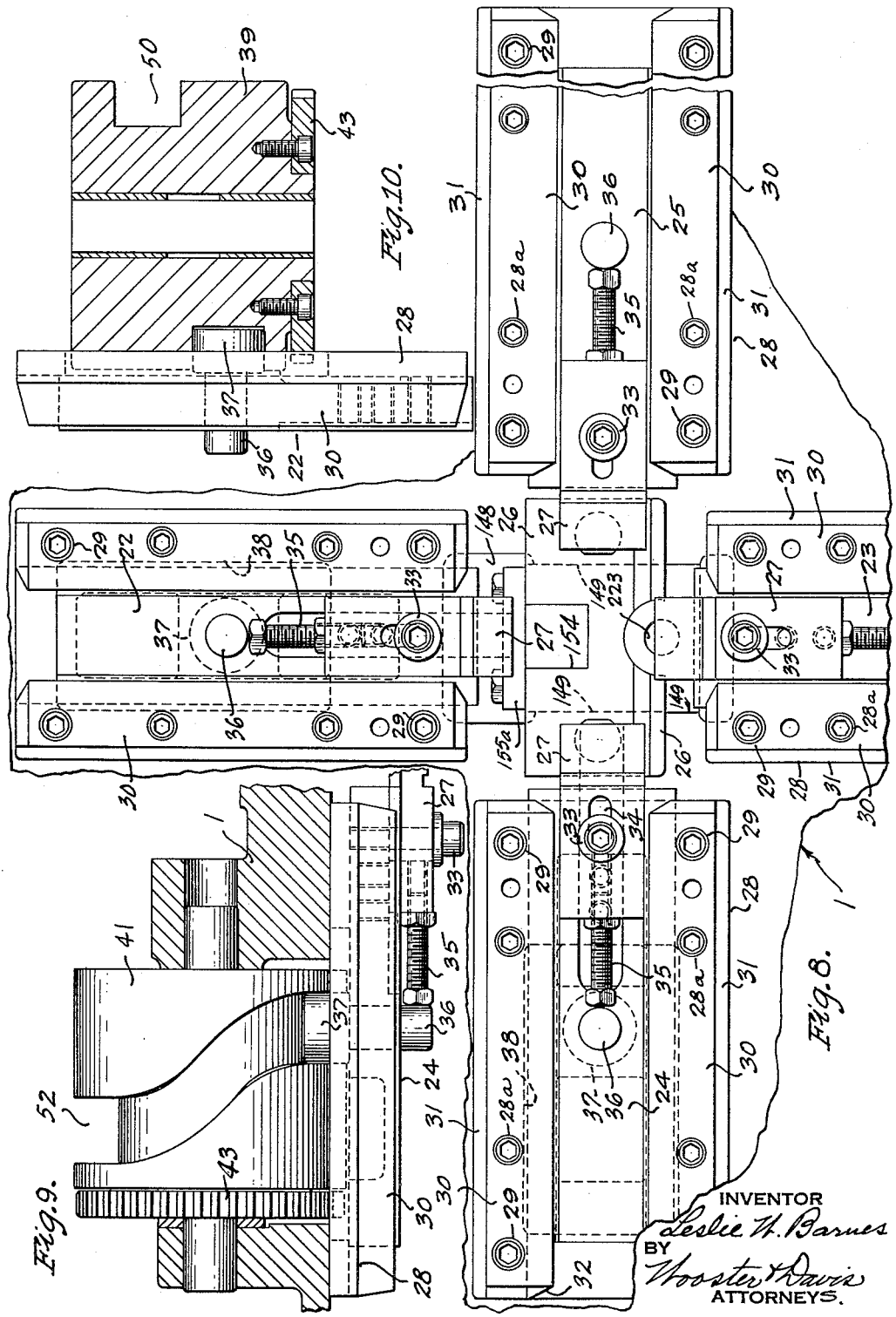

Aug. 7, 1962 L. W. BARNES 3,048,199
VERTICAL FOUR SLIDE WIRE OR RIBBON METAL FORMING MACHINE
Filed March 29, 1956 12 Sheets-Sheet 7

INVENTOR
Leslie W. Barnes
BY
Wooster & Davis
ATTORNEYS

Aug. 7, 1962 L. W. BARNES 3,048,199
VERTICAL FOUR SLIDE WIRE OR RIBBON METAL FORMING MACHINE
Filed March 29, 1956 12 Sheets-Sheet 8
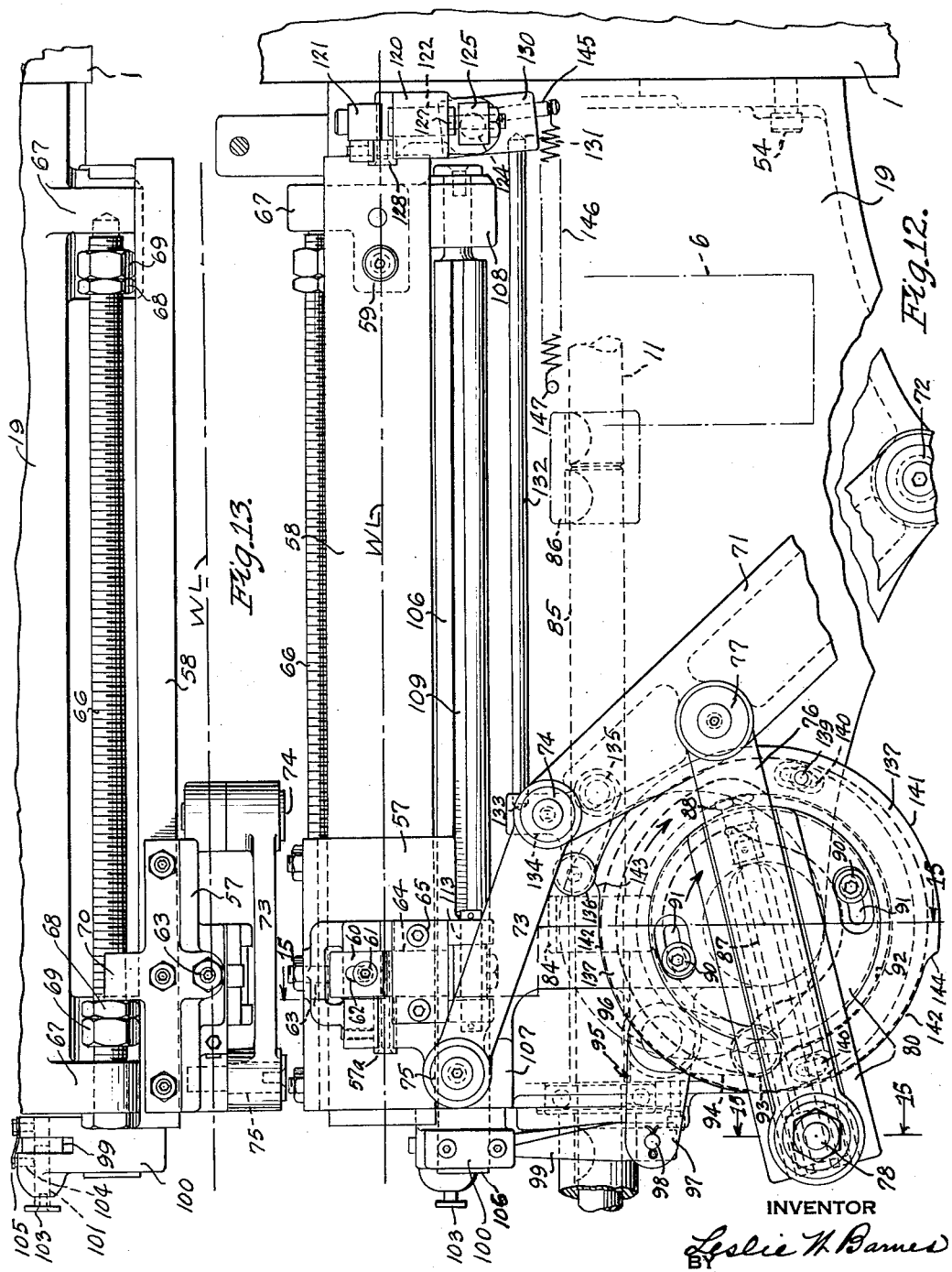
INVENTOR
Leslie W. Barnes
BY
Wooster & Davis
ATTORNEYS.

Aug. 7, 1962 L. W. BARNES 3,048,199
VERTICAL FOUR SLIDE WIRE OR RIBBON METAL FORMING MACHINE
Filed March 29, 1956 12 Sheets-Sheet 9

INVENTOR
Leslie W. Barnes
BY
Wooster & Davis
ATTORNEYS

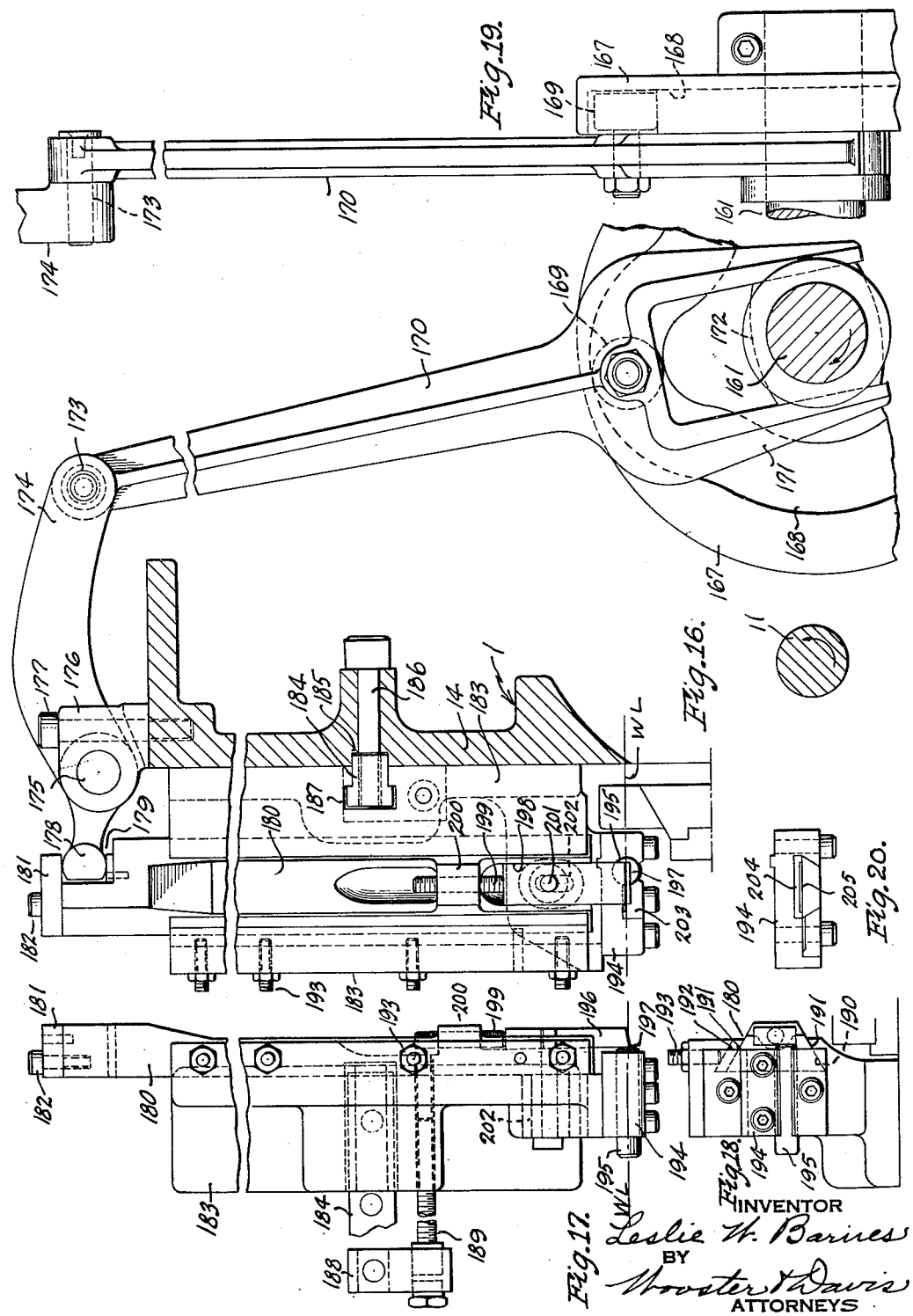

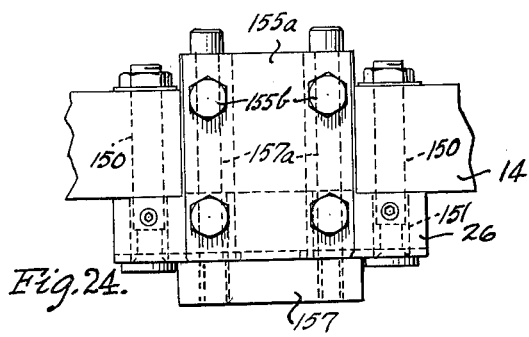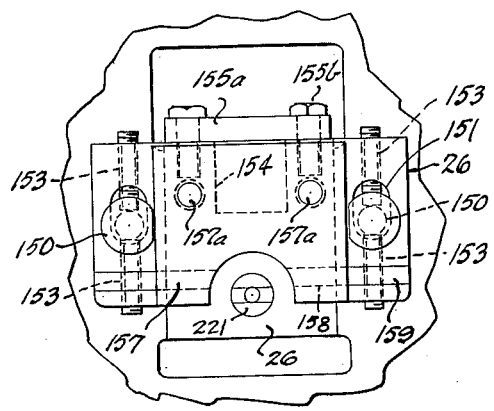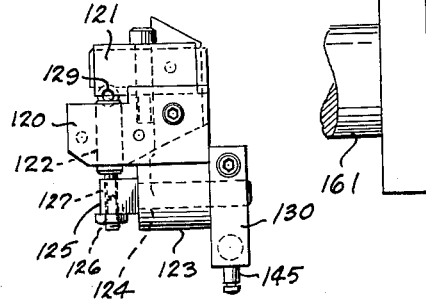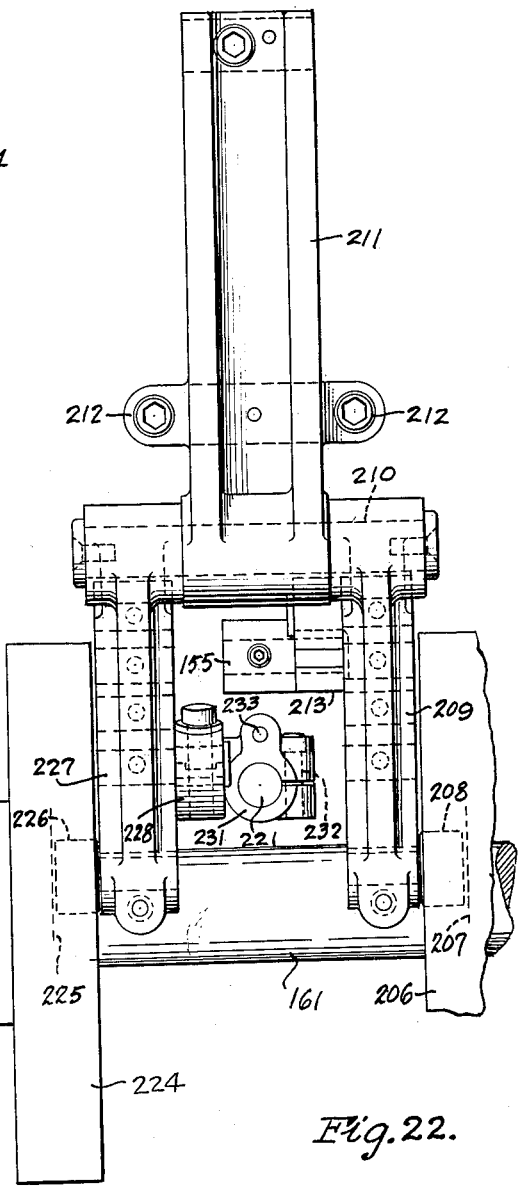

3,048,199
VERTICAL FOUR SLIDE WIRE OR RIBBON
METAL FORMING MACHINE
Leslie W. Barnes, Trumbull, Conn., assignor to The A. H.
Nilson Machine Company, Shelton, Conn., a corporation of Connecticut
Filed Mar. 29, 1956, Ser. No. 574,812
8 Claims. (Cl. 140—71)

This invention relates to a vertical four slide wire or ribbon metal forming machine, and has for an object to provide a novel construction for this type of machine in which the forming slides and associated tool or form holders may be mounted on the front side of a vertical or upright bed or frame, so that all of the tools may be located on the front of the machine for clear vision and accessibility.

Another object is to provide a construction and arrangement whereby the operator or the tool maker may sit at the front of the machine to work on the machine or operate it.

Another object is to provide a construction for this type of machine whereby no large hole is required in the bed of the machine for dropping the finished work through, and in which instead the work is stripped off the end of the form toward the front.

Another object is to provide a construction and arrangement in which the form bracket may be set directly into the bed of the machine for proper and more rigid support, in contrast to the old style of horizontal machine employing the large outboard type of bracket impossible to hold rigid under heavy duty.

A further object is to provide a construction in which the forming slide units are so constructed and mounted that they may be taken from the machine or added at will to suit special requirements, in contrast to the old type of machine where the guides for the slides were planed directly into the bed.

Another object is to provide a construction in which the forming slides have closer support at the working point made posible by elimination of the large hole previously required in the bed, which prevented close support in the old type of machine.

A further object is to provide a construction in which the forming slides may have longer bearings than in the old type, with barrel cams mounted underneath for operating these slides, and in which the cam pressure may be applied in the exact center of the slide, as contrasted with the old type in which a cam and foil were mounted on the side.

A still further object is to provide a construction in which all the operating mechanism may be mounted in the rear of the machine and totally enclosed for safety involving a distinct improvement over the old type where all the shafts were located around the outside of the machine, making it hard for the operator to get at the tools and extremely dangerous for tooling or operating.

Another object is to make a construction which is much more compact and requires less floor space than the old type of machine.

Another object is to provide a construction in which the stripper and form operating mechanism are constructed to permit adjustment of the stroke, where the old style was not, also to provide a structure in which the stripper and form operating mechanism and cams may be made interchangeable.

A further object is the making of the feed unit a completely self-contained unit to make possible its replacement by another completely self-contained feed unit of an entirely different design for special purposes or the elimination of the complete feed unit from the machine if not required.

Another object is to provide a feed mechanism design which would permit the changing of the drive gears for this feed mechanism to a different ratio to obtain, for example, a double feed for wire or metal of twice the length.

Another object is to get the forming slide bearings closer to the wire forming line to minimize the cramping action on the slide bearings.

A further object of this machine, due to the completely open construction at the forming position, is to allow the addition of means for feeding miscellaneous parts from hoppers, cobs, racks and so forth to the forming position direct and without obstruction.

A still further object is to provide a construction and arrangement in which a press attachment for ribbon metal may be substituted for the cut-off unit, and in which with the use of this unit the scrap may be dropped straight through, where in the old style using such units the scrap was pushed into the forming slides on top of the bed.

A further advantage of the vertical type of this novel machine is that it permits the work to be stripped onto rods, racks, and so forth, which was not practical in the old machines, as they were too close to the floor for this purpose. This vertical machine also permits the use of one cam shaft only for compactness and lower manufacturing costs, and a still further object is to provide a construction in which the forming slides may be operated by individually driven cams which may be removed or added without dismantling the cam shaft.

Another object is to provide an improved feeding mechanism for this type of machine which may be constructed and assembled as a completely self-contained unit which may be applied to or removed from the machine as such.

With the foregoing and other objects in view, I have devised the construction illustrated in the accompanying drawings forming a part of this specification. It is, however, to be understood the invention is not limited to the specific details of construction and arrangement shown, but may embody various changes and modifications within the scope of the invention.

In these drawings:

FIG. 1 is a front elevation of the machine;

FIG. 2 is a partial end view of the feed mechanism looking from the left of FIG. 1 and on a larger scale;

FIG. 3 is a rear view of the drive mechanism;

FIG. 4 is an end elevation looking toward the left hand end of the machine;

FIG. 6 is a horizontal partial section and partial plan view of the left hand end portion of the machine with the feed mechanism removed;

FIG. 7 is a similar section and partial plan view of the right hand end portion of the machine;

FIG. 8 is a front elevation of the form bracket and the forming slides for the forming tools located about this bracket and with the greater part of the bed broken away;

FIG. 9 is a detail plan view and partial section of the left hand horizontal cam slide showing its mounting and the cam for operating it;

FIG. 10 is a partial side view and section of the upper vertical forming slide and its mounting with its operating cam;

FIG. 12 is a front view of the feed mechanism and clamp for controlling the wire, including its mounting bracket whereby it may be secured to the upright bed or frame of the machine;

FIG. 13 is a top plan view thereof;

FIG. 16 is a side elevation of the cut-off mechanism showing the associated portion of the bed of the machine in section;

FIG. 17 is a front elevation of this cut-off mechanism looking from the left of FIG. 16;

FIG. 18 is a bottom view looking toward the bottom of FIG. 17;

FIG. 19 is a rear elevation of the cut-off operating lever and the operating cam looking from the right of FIG. 16;

FIG. 20 is a front view of the cut-off block which may be used for flat wire or metal ribbon;

FIG. 22 is a rear view thereof looking from the right of FIG. 21;

FIG. 23 is a front view of a form bracket which may be used, with a form supporting bolster in place;

FIG. 24 is a top plan view thereof, and

FIG. 25 is an end view of the wire check device at the right hand end of the feed mechanism and looking from the right of FIG. 12.

Figure 5:
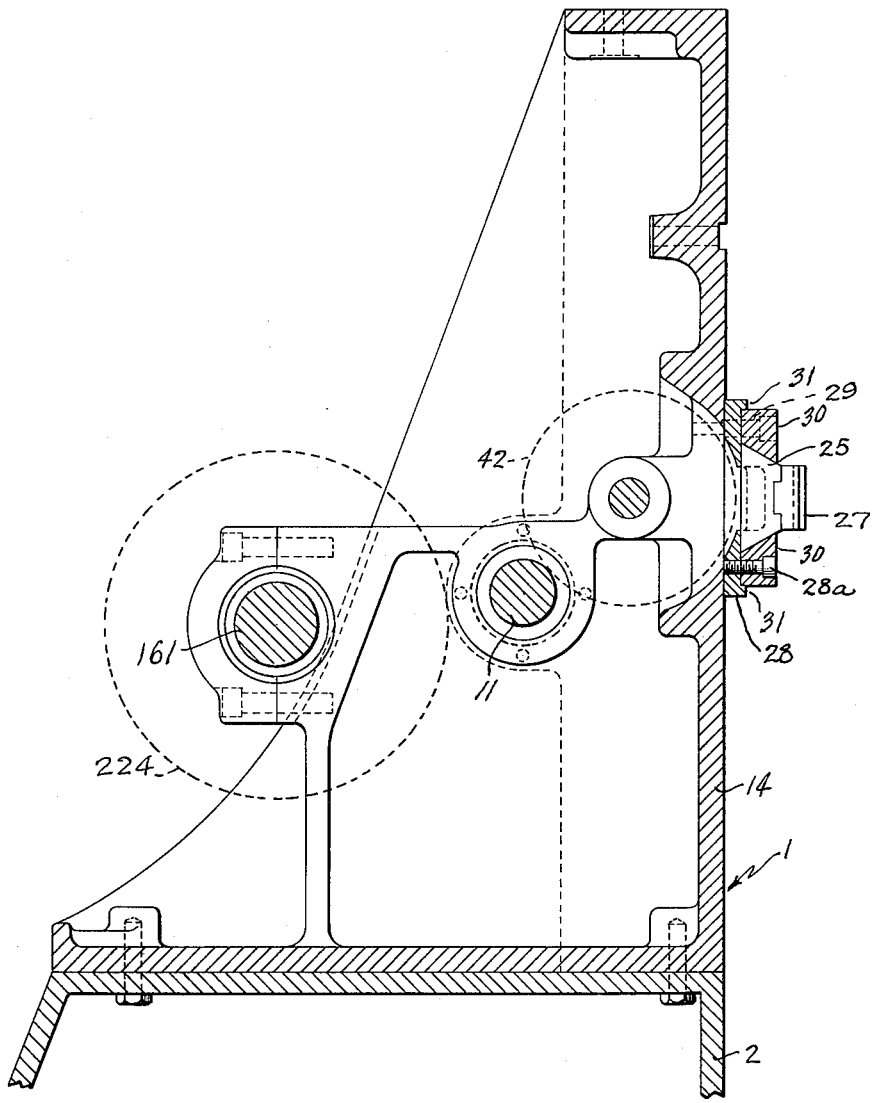
FIG. 5 is a vertical transverse section through the bed of the machine and parts mounted thereon taken at substantially the vertical section of the work station or form bracket.
Figure 11:
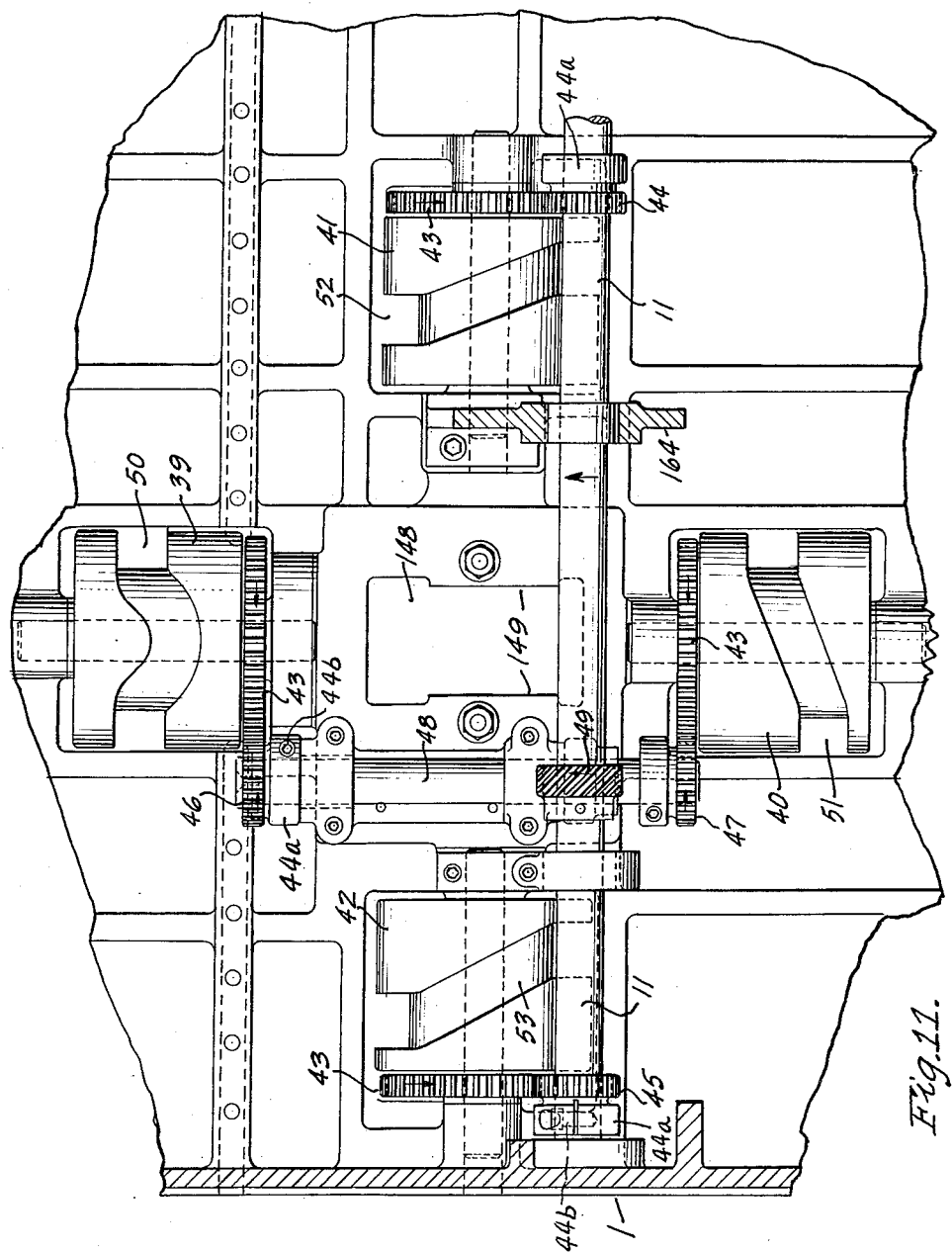
FIG. 11 is a rear elevation of the central portion of the machine and bed showing the cams for operating the individual forming slides and the driving means for these cams, certain parts being shown in section.
Figure 14:
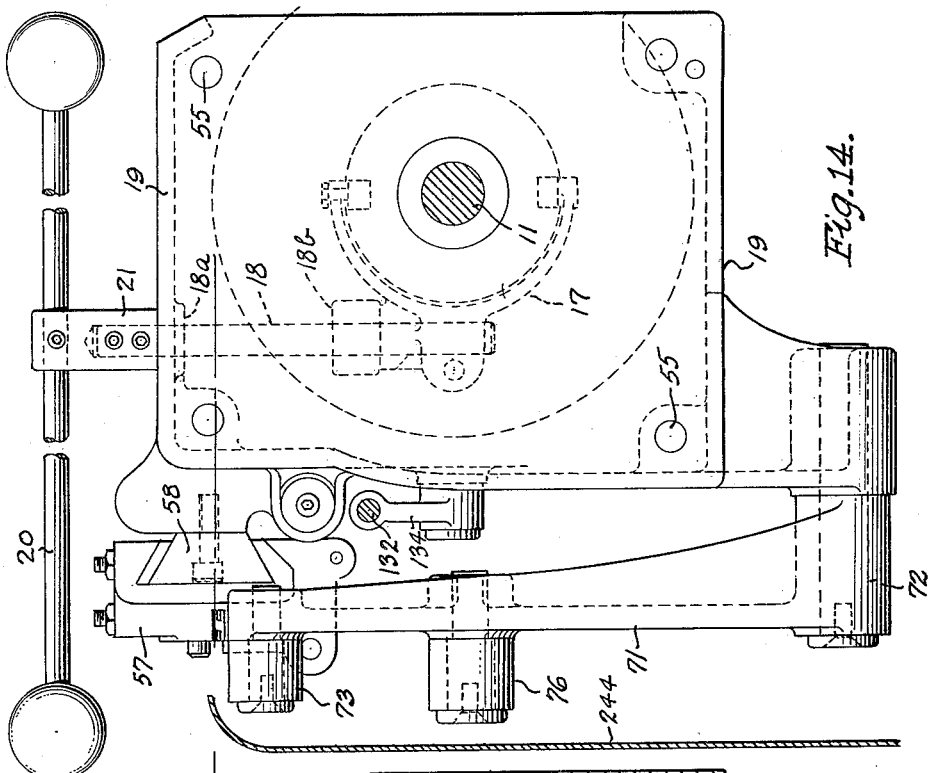
FIG. 14 is an end elevation of the feeding mechanism and its supporting bracket looking from the right of FIG. 12, and with the wire check clamp removed.
Figure 15:
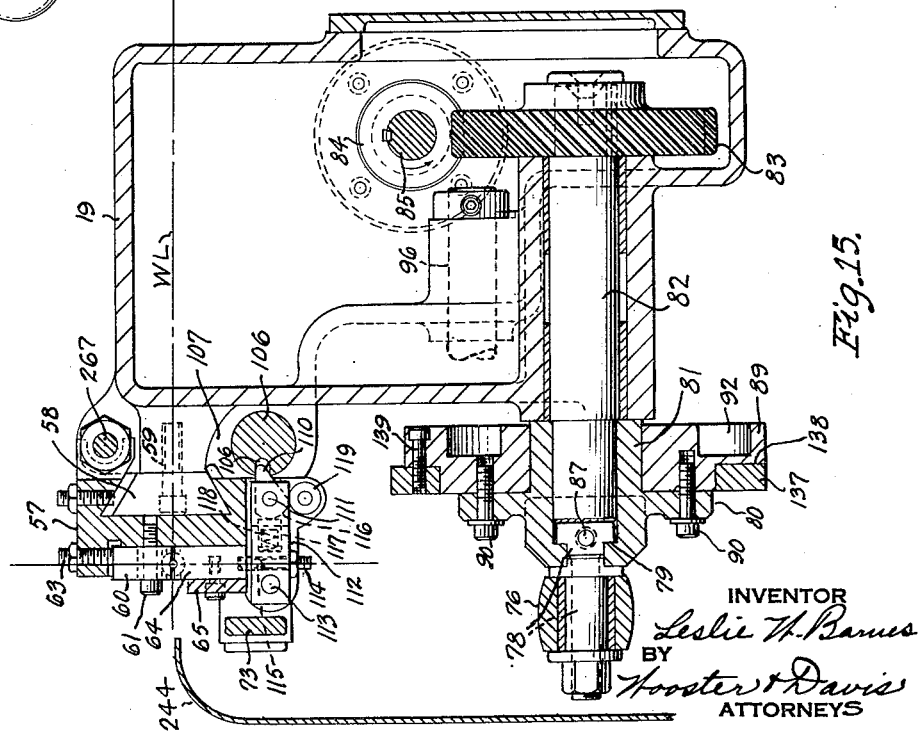
FIG. 15 is a vertical transverse section of the feed mechanism substantially on lines 15—15 of FIG. 12.

This machine comprises an upright bed or frame 1 mounted on the top of a supporting base 2, the various forming tools, slides, feed and guide mechanisms being mounted on the bed 1 with the exception of the variable speed drive 3 which is mounted on the rear side of the base 2, as shown in FIGS. 3 and 4, and connected for driving from a suitable electric motor 4. This reducing drive operates a grooved driving pulley 5 operating a grooved driven pulley 6 through suitable V-belts 7. The mounting plate 8 for the variable speed drive 3 is shown adjustable to control the tightness of the belts 7, and for this purpose the plate is pivoted to the base by a pivot rod 9 and may be adjusted toward and from the base by the adjusting screws 10. The driven pulley 6 is on the main drive shaft 11 mounted in suitable bearings 12 and 13 in the bed 1 and central support bracket 164 (FIGS. 6 and 11), and located to the rear of the upright, preferably vertical, front wall 14 of the bed. This drive shaft is driven from the grooved pulley 6 through the friction clutch 15 (FIG. 6) which is controlled by the grooved member 16 splined on the shaft and shiftable to and from the driving position by the clutch fork 17 mounted on and keyed to the shipper shaft 18 (FIGS. 6 and 14) mounted in bearings 18a and 18b in the feed bracket 19 and operated by the shipper handle 20 (FIGS. 4 and 14) through the hub 21 secured on the shipper shaft 18.

Mounted on the front upright wall 14 of the bed 1 are four forming slides for carrying the forming tools, and each mounted in a suitable slideway detachably mounted on the front of this upright wall 14. These slides, as shown in FIGS. 1 and 8 comprise upper and lower vertically movable slides 22 and 23 respectively and two horizontally movable left and right hand slides 24 and 25 respectively located about a work station represented by a form bracket 26, the vertical and horizontal slides being movable at right angles to each other toward and from this work station for the forming operations of a wire or ribbon on suitable forms at this station, no particular form being shown, as, of course, the form for any particular article will be designed for that particular article to secure the desired shape and structure of the finished article. Also no particular tools are shown mounted on these slides as they will, of course, depend on the particular article to be formed and the operations to be performed in making this article. These tools would be secured to suitable tool holders 27 mounted on the inner ends of these slides and secured by any suitable means (not shown). Each slide with its slideway is detachably or removably mounted on the upright front wall 14 of the bed so that each slide may be applied or removed independently of the others as required for different forming operations for making the different articles. As shown in FIGS. 5 and 8 to 10, each slide assembly or unit comprises a slideway 28 comprising a plate secured to the face of the upright wall 14 of the bed by suitable screws 29, which screws with 28a may be used to secure the slide gibs 30 to the slideways 28, these slideways also having at their opposite outer edges outwardly or forwardly extending longitudinal flanges 31 against which the outer edges of the slider gibs 30 may be positioned to hold them in proper parallel relation, the inner edges of these gibs being inclined as shown at 32 to provide a dovetail guide or slide for the similarly shaped opposite edges of the tool slides 22 to 25. The tool holders 27 are adjustably secured on their respective slides by means of the screws 33 passing through a suitable longitudinally elongated slot 34 in each holder and threaded into the slide, this slot arrangement permitting longitudinal adjustment of the holder on the side by means of an adjusting screw 35 threaded into the outer end of the holder and abutting a stop pin or stud 36 mounting a cam roller 37 in the slide. After adjustment the holder may be clamped in this position by means of the screw 33. Each slideway 28 has an elongated central opening 38 permitting longitudinal movement of the cam roller 37 in operating the forming slide.

Each individual forming slide 22 to 25 is operated by its individual barrel cam, the upper slide 22 being operated by the cam 39, the lower slide 23 by the cam 40 (FIG. 11), the left hand horizontal slides 24 by the cam 41, and the right hand horizontal slide 25 by the cam 42. Each cam is individually driven from the drive shaft 11. For this purpose there is secured to each cam a spur gear 43 and the horizontal cams 41 and 42 are driven from the shaft 11 by the pinions 44 and 45 respectively meshing with these gears, while the vertical cams 39 and 40 are driven by the pinions 46 and 47 respectively meshing with these gears and mounted on a vertical drive shaft 48 driven by the helical gears 49 from the main drive shaft 11. Pinions 44, 45, 46 and 47 are each clamped to their respective drive shaft 11 or 48 for independent angular adjustment about their shafts respectively by a split hub 44a and clamping screw 44b, as shown for pinion 45 in FIG. 11, and indicated on the other pinions in FIGS. 6, 7 and 11. The barrel cams 39 to 42 are each provided with the properly shaped cam grooves 50, 51, 52, 53 respectively, each shaped to receive the cam rollers 37 connected with each individual forming slide 22 to 25, and shaped to correspond with the movements to be imparted to its respective forming slide for the proper operation of the tool carried by this slide in the work forming operation. The stem 36 of each cam roller extends through a bearing opening in each slide 22 to 25 for imparting the movement of the cam roller to this slide.

Improved means is provided for feeding a wire or ribbon to the work station for the forming operation to produce the article to be formed. The ribbon in effect is a flat wire, and the wires either round or flat may be of various diameters or widths and thicknesses. The feed mechanism is so constructed that it may be assembled as a unit and applied as such to the machine for operation therewith in proper timed relation to the operations of the forming slides and the tools carried thereby. It is shown in FIGS. 1, 2, 4, and 12 to 15. It comprises a feed bracket 19 on which the feed mechanism is mounted and assembled, and which feed bracket is secured to the left hand end of the bed 1 by any suitable means, such, for example, as the screws 54 extending through the openings 55 (FIG. 14) and threaded into the end wall 56 of the bed.

This feed mechanism comprises a feed slide 57 mounted for longitudinal sliding movements on a dovetail guide 58 secured in a horizontal position at the upper part of the bracket 19 by any suitable means, such, for example, as the screws 59. This slide carries means for gripping the wire or ribbon and feeding it forwardly to the work station from any suitable supply such, for example, as a reel carrying a coil of this material, and it is usually run through a suitable roll straightener (not shown). This wire gripping and feeding means comprises a gripping die 60 which is mounted on the slide for vertical adjustment by means of a suitable screw 61 extending through a vertical elongated slot 62 in the die and threaded into the slide 57. An adjusting screw 63 threaded in the slide engages the top of the die to determine its position. Located below and cooperating with the lower end of this die is a vertically movable gripping slide 64 mounted in a suitable guideway in the slides 57 and held therein by the cap 65. A longitudinally extending stop screw 66 is mounted at the rear of the guide 58 in lugs 67 in the bracket, and on it are stop nuts 68 and 69 which may be adjusted to different positions on the screw to co-operate with a rearwardly extending forked lug 70 on the feed slide 57 to limit movements of the slide at the opposite ends of its movement.

The slide 57 is shifted back and forth on the guide 58 for the feeding movements by a feed lever 71 pivotally mounted on the bracket 19 at 72, and connected with the feed slide 57 by a feed link 73 pivotally connected at 74 to the upper end of the lever 71 and at its opposite end pivotally connected at 75 to slide 57. The lever 71 is operated by a crank link 76 pivotally connected to the lever 71 at 77 at one end and at its opposite end pivotally connected by a T-bolt 78 slidably mounted for adjustment in a T-shaped channel 79 in a feed crank plate 80 mounted by a hub 81 on a shaft 82 driven by helical gears 83 and 84 from the feed drive shaft 85 which is an extension of the main drive shaft 11 and connected thereto by the coupling 86 keyed to both the shaft 11 and the shaft 85. The T-bolt 78 is mounted for adjustment in the slot or guide 79 by a suitable adjusting screw 87 threaded into the head of this bolt and operable by a screw head 88 secured to the other end of the screw and mounted in the crank plate 80, this head having a hex or similarly shaped portion for operation by a wrench in adjusting the T-bolt 78 along the T-slot 79 to vary its distance from the axis of the shaft 82 on which it is mounted to vary the throw of the lever 71 and therefore the travel of the feed slide 57.

A cam 89 is mounted on the hub 81 of the feed crank plate 80 and is secured for angular adjustment thereon by the screws 90 passing through elongated curved slots 91 in the plate and threaded into the cam. This cam operates the wire gripping slide 64, and for this purpose it is provided with a cam groove 92 in which runs a cam roller 93 mounted on the arm 94 of a feed grip lever 95 mounted on a shaft 96 mounted in the bracket 19, and the other arm 97 of which is a forked arm pivotally connected at 98 to the lower end of a feed grip link 99 pivotally connected at its upper end to a feed grip crank arm 100. This is a forked arm, as indicated in FIG. 13, and has a slidable pin 101 passing through an elongated slot 102 in the link 99 and this pin may be withdrawn by the finger grip 103 to disconnect the link 99 from the arm 100 for setting-up or adjusting operations of the device, the pin 101 being held in either the connected or disconnected position by a locking pin 104 and its retaining spring 105. The arm 100 is mounted and secured to a feed grip bar 106 mounted for turning movements in suitable bearings 107 and 108 in the bracket and provided with an elongated longitudinal channel 109 in one side in which seats the free end 110 (FIG. 15) of a cam lever pivotally mounted at 111 in a feed grip lever 112 pivoted on a fulcrum pin 113 in the feed slide 57 and carrying an adjustable screw 114 operably connected with the lower end of the work grip slide 64 by a push rod 115 seating at its upper end in a socket or recess in the lower end of the slide. The lever 110 has a curved inner end 116 against which is pressed a spring friction plug 117 by a spring 118, and this lever when in its lower position rests on a roller 119. Rocking movements of the shaft 106 will operate the lever 110 and through its frictional connection with the lever 112 will operate the lever 112 to operate the grip slide 64 to grip the wire or ribbon according to the shape and therefore operation of the cam groove 92 on the roller 93 and the lever 95 and link 99. The rounded end 110 of the lever is slidable in the channel 109 of the shaft 106 as the feed slide is reciprocated back and forth to maintain the operative connection of the feed grip lever 112 with this shaft 106. A suitable guide quill 57a for the wire is mounted in the feed slide in front of the grip die 60 and grip slide 64.

At the opposite or inner end of the guide 58 is a check grip for gripping the wire at the end of the forward feeding operation and to hold it during backward or reverse movement of the feed slide 57 to prevent the wire being carried back with this movement. It comprises a check bracket 120 (FIGS. 12 and 25) mounted on the bracket 19, and on this is mounted a check die 121 above the line of wire feed indicated at WL, and below this die is a vertically movable grip pin 122 mounted to slide vertically in the bracket 120. Mounted in a downwardly extending bearing lug 123 in the bracket is a rock shaft 124 having a head 125 in which is mounted an adjusting screw 126 for a push rod 127 extending at its upper end in a recess in the lower end of the grip pin 122. The screw 126 and the push pin 127 are offset laterally, or to the right as viewed in FIG. 12, of the axis of the shaft 124 so that turning of this shaft counterclockwise will lift the grip pin 122 and cause it to clamp the wire against the under side of the die 121 to grip and hold the wire during reverse or backward movement of the feed slide 57, there being a tubular guide quill 128 in front of this die and pin to form a support and guide for the wire, and the under face of the die 121 may be recessed or provided with a transverse groove 129 to form a seat for the wire. Secured on the opposite end of the shaft 124 from the head 125 is an arm 130 having a recess 131 in which is seated the end of a push rod 132, the opposite end of this rod seating in a recess 133 in a cam operated lever 134 pivotally mounted at 135 in the bracket 19 and having a laterally extending arm carrying a roller 136 running on the rim of a check cam 137 mounted on the feed cam 89, preferably in a recess 138 in this cam and secured therein by any suitable screws 139 threaded into the cam and passing through circular elongated slots 140 in the cam 89 to permit angular adjustment of the cam 137 with respect to the cam 89 and its operating shaft 82. The rim of this cam 137 is shaped to operate the lever 134, and, through the push rod 132, to operate the grip pin 122 to grip the wire in certain timed relation with the operation of the feed slide 57. For this purpose it is provided with a high portion 141 and a low portion 142 separated by the steps 143 and 144. Mounted on the check arm or lever 130 is a pin 145 connected by a spring 146 to the bracket 19 at 147 tending to turn the shaft 126 to the right, or clockwise as viewed in FIG. 12, and permit the grip pin 122 to drop and release the wire as the roller 136 runs down the relief or step 143.

The mounting of the feed crank 80, feed grip cam 89 and wire check cam 137 on the separately driven shaft 82 permits changing of the gears 83, 84 for driving this shaft to different ratios to obtain different lengths of feed, as for example, to obtain a double feed for wire or metal of twice the length.

Figure 21:
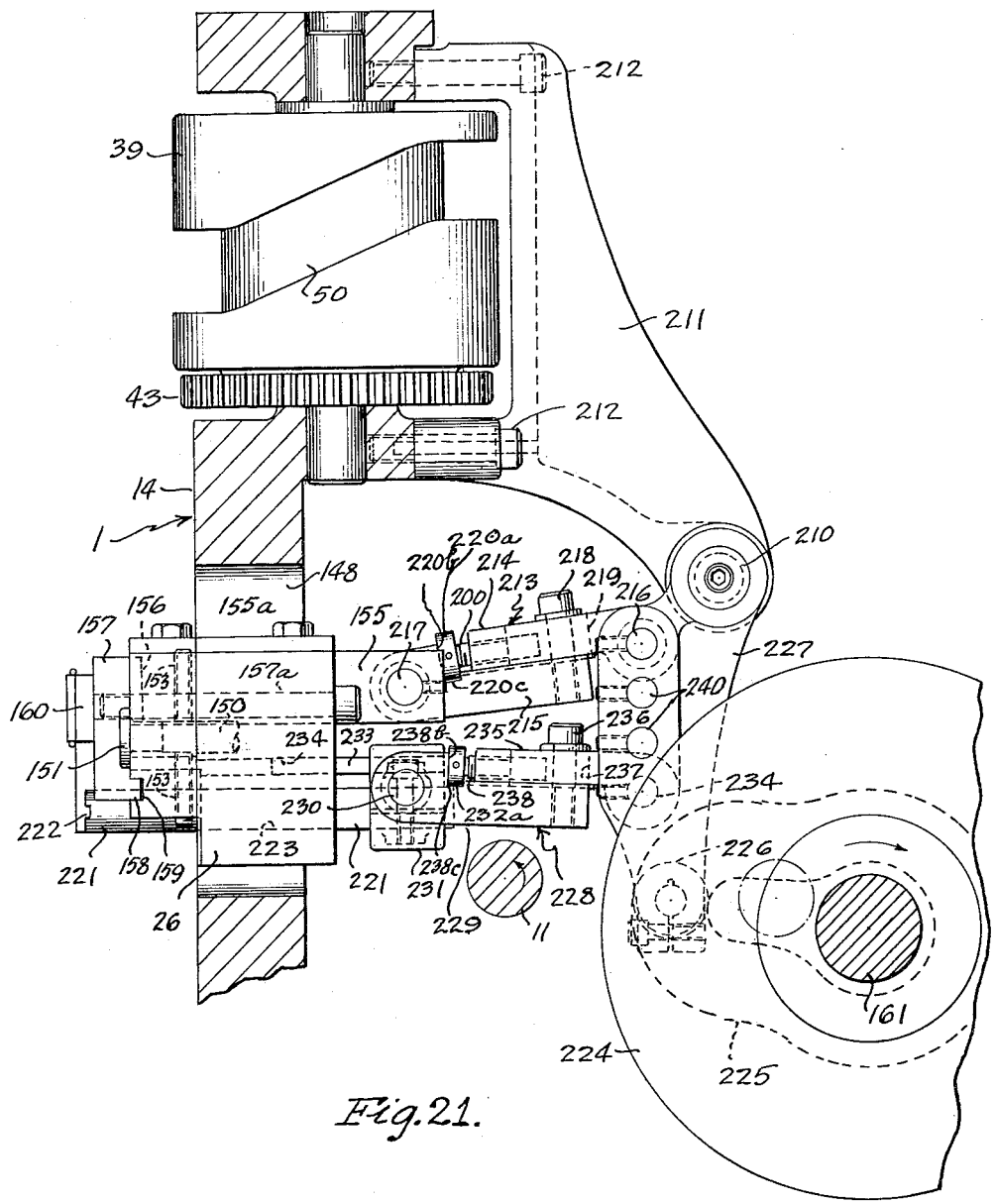
FIG. 21 is a vertical elevation of the stripper and form moving mechanism, and partial section of the mounting therefor.

At the work station the form bracket 26 (FIGS. 1, 8, 21, 23 and 24) is mounted in an opening 148 in the upright front wall 14 of the bed 1, and is mounted for vertical adjustment in the guides 149 on the upright side walls of this opening. The means for mounting this slide for this adjustable movement comprises a pair of bolts 150 mounted in the upright wall 14 of the bed and passing through elongated slots 151 in the bracket 26, these bolts having flat heads 152 on the front of the bracket. The bracket is adjustable by means of the adjusting screws 153 in the bracket engaging at their inner ends at the top and bottom sides of the bolts 150, as shown in FIG. 23. This bracket 26 is provided with a rectangular recess 154 extending downwardly from its top edge, in which may be mounted a stationary form (not shown) or it could receive for sliding movement and form a supporting guide for a form slide 155 (FIG. 21). This slide may be retained in this recess by a suitable cap 155a secured to the bracket over the top of the recess by the screws 155b (FIGS. 21, 23 and 24). This recess could also receive a positioning lug 156 on the back of a supporting bolster 157 for a form 160 if preferred, this bolster having a transverse rib 158 on its lower rear side seating in a corresponding groove or channel 159 in the front wall of the bracket 26, this bolster, as previously indicated, forming means by which certain forms may be mounted in the bracket for the forming operations. It will be understood these forms are provided for supporting the wire and on which it is bent or formed by the action of the tools on the forming slides 22, 23, 24 and 25 during the forming operations.

After the proper length of wire is fed forwardly to the work station by the feed mechanism, it is cut off to proper length by a cam operated cut-off mechanism, shown in detail in FIGS. 16 to 20 inclusive. Mounted in a horizontal position in the bed 1 to the rear of its upright front wall 14 and the drive shaft 11 is a cam shaft 161, this shaft being mounted in suitable roller bearings 162 (FIGS. 6 and 7) at its opposite ends in the bed 1 and by similar intermediate bearings 163 in a center support bracket 164 (FIGS. 6 and 11) mounted in the bed 1 at the rear of its upright wall 14. This cam shaft is driven from the drive shaft 11 by a gear 165 keyed to the cam shaft meshing with a pinion 166 keyed to the drive shaft. Mounted on the cam shaft is a cut-off cam 167 (FIGS. 6 and 16) provided with a suitably shaped cam groove 168 in which runs a cam roller 169 mounted on a forked lever 170, this lever having a forked lower end 171 embracing a guide block 172 mounted on the cam shaft 161 for free rocking movements. This block therefore forms a sliding pivotal or rocking connection of the lever 170 on the shaft 161. At its upper end the lever 170 is pivotally connected at 173 to a cut-off lever 174 pivoted at 175 in a bracket 176 secured to the top of the bed 1 by any suitable means, such, for example, as set screws 177. Forwardly of the pivot 175 this lever 174 includes a rounded head 178 seating in a notch or recess 179 in the rear of the upper end of a vertically movable cut-off slide 180. The head 178 may be retained in the recess by a suitable cap 181 over the top of the recess and secured in this position by the screw 182. The cut-off slide 180 is mounted for vertical sliding movement on the front side of the upright front wall 14 of the bed 1. A guide block 183 is mounted for lateral horizontal adjustment on the wall 14 by an elongated T-nut 184 secured in a horizontally extending groove 185 in the front side of the wall 14 by suitable screws 186 passing through the wall 14 and threaded into the nut 184. The forward T-shaped portion of this nut 184 is located in the transverse similarly shaped channel 187 in the block 183 and forms a guide on which the block may be adjusted horizontally and then clamped in adjusted position by the screws 186.

Adjustment of the block 183 may be effected by an adjusting block 188 secured on T-bolt 184 and carrying an adjusting screw 189 mounted in the block 188 and threaded into the block 183.

The block 183 has an upright dovetail slideway 190 (FIG. 18) for the slide 180, this slide having similarly tapered side walls 191 running in this guideway, the opposite side being formed by an adjustable gib 192, which may be adjusted for wear by the adjusting screws 193.

Mounted on the lower end of the block 183 is a cutoff block 194 carrying a cut-off quill 195 having a transverse guide opening for the wire, and adjustably mounted on the lower end of slide 180 is a cut-off tool 196 having a sharp cut-off edge 197 on its lower end movable across the end of the cut-off quill 195 and cooperating therewith to cut off the wire when operated downwardly across this exit end of the quill. The cut-off tool is adjustably mounted on the slide 180 in an upright guideway or channel 198 and positioned by an adjustable screw 199 threaded in a lug 200 on the slide and engaging a top end of the tool 196, after which the tool may be clamped in adjusted position by a screw 201 passing through an elongated slot 202 in the slide and threaded into the tool 196. The cut-off quill 195 is removably and adjustably mounted in the under side of the cut-off block by a detachable clamp 203.

If a flattened wire or ribbon is used instead of a round wire, then the cut-off quill is shaped accordingly and the tool 196 made sufficiently wide to cut off this flattened wire or ribbon. Such a metal guide or quill is shown at 204 in FIG. 20, provided with an elongated guide opening 205 for the flattened wire or ribbon across the exit end of which the cut-off tool 196 is operated to cut off this flattened wire.

After the forming operation at the work station, the formed work may be stripped from the form on which it has been formed, either by retracting the form through a stationary stripper, if a movable form is used, or by a movable stripper if a stationary form is used. A movable form and stripper is shown in FIG. 21, with means for operating the form and stripper shown in this figure and in FIG. 22. As previously described, a movable form or slide is shown at 155 mounted for sliding and retractable movement in the recess 154 in the form block 26, and it is given reciprocating movement to and from the article forming position by a form-operating cam 206 (FIG. 22) mounted on the cam shaft 161, and provided with a suitable cam groove 207 in which runs a cam roller 208 on a lever 209 mounted on a fulcrum pin 210 mounted in the lower end of a bracket 211 secured to the rear side of the upright front wall 14 of the bed 1 by any suitable means, such, for example, as the screws 212. This lever is connected to the rear end of the form slide 155 by the adjustable link 213 comprising two overlapped link ends 214 and 215 pivotally connected respectively at 216 and 217 to the lever 209 and slide 155, and adjustably connected together by a clamping screw 218 threaded into the lower link end 215 and passing through an elongated slot 219 in the upper link end 214, and the two links may be adjusted longitudinally to vary the length of the link 213 by an adjusting screw 220 threaded into the free end of link 214 and provided with a flat head engaging the upright wall 220 on the head of member 215 and seating at its lower edge in a channel or recess 220c in this member. The cam groove in the cam 206 is shaped to operate the slide 155 in certain timed relation with the forming operations.

Also associated with and mounted in the form bracket 26 may be a stripper device including a stripper post 221 which may be formed at its forward or outer end 222 for mounting a stripper tool or die, depending on the type of work which has been performed in the forming operation. This post is slidable in a bearing 223 in the lower part of bracket 26 and is operated for longitudinal sliding movement by mechanism similar to that used for the form slide 155. For this purpose there is mounted on the cam shaft 161 a cam 224 provided with a cam groove 225 in which runs a cam roller 226 mounted on the free end of a lever 227 similar to the lever 209 for operating the slide 155, and pivotally mounted on the same fulcrum pin 210 as the lever 209, but on the opposite side of the bracket 211. This lever 227 is connected to the stripper post 221 by the same type of adjustable link as is used at 213 for connecting the lever 209 to the slide 155. This adjustable link is indicated at 228 comprising the lower link end 229 pivotally connected by a stud 230 to a stripper block 231 which is a split block clamped to the post 221 by a suitable screw 232 which permits it to be connected at different positions on the post, and this block carries a guide pin 233 slidable in a suitable guide opening 234 in the form bracket to prevent the post turning in this bracket. The connecting link 228 also includes an upper end member 235 overlapped with the lower member 229 and adjustably connected therewith by a clamping screw 236 threaded into the lower member and passing through an elongated slot 237 in the upper member and may be adjusted to different lengths for the link 228 by an adjusting screw 238 threaded into the end of the upper link end 235 and having a flat head 238a abutting the upright wall 238b on the end of member 229 and seating at its lower edge in a recess 238c in this member. This upper link end 235 is pivoted to the lever 227 by a pivot stud 239. Both the lever 209 and 227 are provided with a plurality of longitudinally spaced openings or positions 240 for the pivot studs 216 or 239 to vary the distances of these studs from fulcrum pin 210 to vary the throws of the slide 155 and the stripper post 221.

The operation is as follows: The wire, either a round wire, or a flat wire which may also be called a ribbon, is drawn from a supply reel (not shown) and passes through a wire straightener (also not shown) into a guide quill 57a (FIGS. 1 and 12) and then between the movable gripping slide 64 (FIGS. 12 and 15) and the stationary gripping die 60 mounted on the feed slide 57. The wire is thus gripped between the slide 64 and the die 60 and slid forwardly, or to the right as viewed in FIGS. 1 and 12, to the work station on the forming bracket 26 (FIGS. 1, 8 and 21). During this feeding movement it passes through the check means at the right hand end of the feed mechanism comprising the check die 121 and the check grip pin 122, passing through the guide quill 127 by which it is guided between the die 121 and the pin 122, and which grip pin 122 is operated by the push rod 132 and the cam 137 to grip the wire at the end of the feeding operation, and holds the wire while the feed slide returns to its retracted or left hand position shown in FIG. 12. Beyond the check grip the wire passes through the cut-off quill 195 (FIGS. 1, 16, 17 and 18) to be cut off to proper length by the cut-off knife 196. The cut-off wire is formed around a form mounted either as a movable form 155, for example (FIG. 21), mounted in the square opening 154 (FIGS. 1, 8 and 23) of form bracket 26 or as a fixed form mounted in this opening or on the bolster 157, by the tools mounted on the forming slides 22, 23, 24 and 25 (FIGS. 1 and 8). The usual sequence of forming operations is, first by the top slide 22, second the side slides 24 and 25 moved simultaneously, and last the bottom slide 23, but of course these operations may be varied as required or found desirable. Then the slides are withdrawn leaving the work on the form where it is stripped off by the stripping mechanism, either by withdrawal of the movable form 155 or operation of the stripping means on the stripper post 221 (FIG. 21).

The wire straightener (not shown) is mounted on a bracket 241 (FIG. 1) mounted by any suitable means on the outer end of the feed bracket 19. The drive shaft 11 is driven by pulley 6 mounted on the friction clutch 15 operated by the shipper fork 17 (FIGS. 6 and 14), and the shipper handle 20. The cam shaft 161 is driven from the drive shaft 11 through the gears 166 and 165, their individual drives to the cams 39 to 42 (FIGS. 6, 7, 9, 10 and 11) operating the forming slides 22 to 25 (FIG. 8) through the individual gears 43 to 47. The vertical drive shaft 48 (FIGS. 7 and 11) is driven from the drive shaft 11 through the helical gears 49. On the right hand end of the drive shaft 11 is mounted a hand wheel 242 (FIGS. 1 and 7) for turning the machine manually in setting up, adjusting and so forth. The feed drive shaft 85 is an extension of the main drive shaft 11 through the coupling 86 (FIG. 12). The feed crank plate 80 is driven to move the feed slide 57 longitudinally through the helical gears 83 and 84 from the feed drive shaft 85 to the shaft 82. The feed grip dies 60 and 64 grip the wire through the cam 89 through the lever 95, link 99, arm 100, shaft 106 and levers 110 and 113. Pin 101 (FIG. 13) can be partially pulled out to disconnect the arm 100 from the link 99 so that the feed grip does not function. This is often used by the tool setter when setting up the tools. The wire check clamp 121, 122 mounted at the right hand end of the feed slideway is operated from the cam 137 through the roll 136 on the lever 134 through the push rod 132. The wire cut-off (FIGS. 16 to 18) comprising the movable cut-off tool or knife 196 is operated from the cam 167 on the cam shaft 161 through the fork 170 and lever 174. The cut-off unit is adjustable to obtain proper cut off position in relation to the forming tools, and cam 167 operates in timed relation with the wire feeding and forming operations. The forming slide units including the slides 22 to 25 are mounted on the front vertical face of the front upright wall 14 of the bed 1. As previously indicated, all of these forming slides are operated by similar barrel cams, each individually gear driven from the main drive shaft 11, and on top of each slide is mounted a tool holder into which is fastened the various shaped forming tools. The form bracket 26 (FIGS. 1, 8, 21 and 23) is set into an opening in the vertical front wall 14 of the bed, giving a very firm, rigid support for this bracket. The square or rectangular opening 154 in this bracket is used for mounting small stationary forms, or movable forms such as indicated at 155, or a slide for stripping a stripper post 221 mounted in this bracket. If the form to be used is large, then a bolster 157 is mounted on the form bracket 26 in which the larger form may be mounted. The fork bracket 26 is adjustable up and down for proper positioning in the opening 148 in the vertical wall of the bed, and the stripper rod or post 221 has provision for mounting a stripper on its outer end. This rod, as previously indicated, is operated by the cam 224 through the lever 227 and the connecting means 228.

This novel construction of machine has a number of distinct advantages over the old horizontal type of machine. All of the tools are out on the front of the machine for clear vision and accessibility. The operator or the tool maker or setter may sit at the front of the machine to work on it or operate it. No large hole is required in the bed to drop the finished work through, as is necessary in the horizontal machine, and the work is stripped off the end of the form toward the front. The form bracket is set directly into the bed of the machine for proper support, where in the old type of horizontal machine a large outboard type of bracket is used which was impossible to hold rigid under heavy duty. Each of the forming slides in this machine is mounted as a unit in the support, which may be individually taken from the machine or added to it as desired to suit special requirements. The old type of machine had the slideways for these slides planed directly into the bed. With this new arrangement the forming slides have closer support at the working point because the large hole required in the bed of the old type of machine prevented close support of the slides. The forming slides also may have longer bearings, with the operating barrel cams mounted beneath or to the rear of the slides. Better operation of the slides is also effected because with this arrangement the cam pressure can be applied in the exact center of the slide. In the old style the cam and the roll were mounted out at the side. In this new machine, all operating mechanism is in the rear of the machine where it is to the rear of the upright top wall 14 of the bed, and may be totally enclosed for safety by any suitable form of closing housing or casing, such as indicated diagrammatically at 243 (FIGS. 1, 4 and 6) and portions in section (FIGS. 6, 14 and 15), and a similar enclosure 244 (FIGS. 14 and 15) may be used for the feed mechanism. In the old style of machine the shafts were located outside around the machine, making it hard to get at the tools and extremely dangerous for tooling or operating. In addition, this machine is more compact, thus requiring less floor space, which is a material improvement. As previously indicated, the slide form 155 and stripper 221 operating mechanism (FIG. 21) are adjustable for various strokes, which was not true in the old type of machine, and also as indicated in FIGS. 21 and 22, the stripper and form operating mechanisms are interchangeable, which was not true in the old type of machine. In this new machine, a press attachment for operations on ribbon metal may be substituted for the cut-off unit, and in this case the scrap drops straight through without interfering with the other elements, while in the old style of machine such a press pushed the scrap into the forming slides on top of the bed. This new type of machine also allows the work to be stripped onto rods, racks, and so forth, from the form on which it is made, while the old type of machine was too close to the floor for this purpose. Also in this new machine, only one cam shaft is required, giving greater compactness and lower manufacturing cost.

Having thus set forth the nature of my invention, I claim:

1. In a wire or ribbon metal forming machine, a bed having an upright front wall, a work station on said wall including means for performing operations on a work piece, a plurality of tool slides mounted on the front wall for movement in an upright plane at substantially right angles to each other toward and from the work station, drive shafts located to the rear of said wall, an individual barrel cam located to the rear of said wall for operating each tool slide, an independent separate bearing pin for each cam mounted at the rear of said wall, a driving connection from a drive shaft to each cam including a gear secured to one end of each cam and a pinion meshing therewith mounted on the shaft, each pinion including means for clamping it to the shaft in different angular positions about the axis of the shaft, a driving connection from each cam to its respective slide arranged to shift the slide in a direction parallel to the axis of the cam, and means for driving the drive shafts.

2. In a wire or ribbon metal forming machine, a bed having an upright front wall, a work station including means for mounting a form on said front wall, a form mounted on said means, a plurality of tool slide units removably mounted on the front of said upright wall about said station each including a slideway member and a tool slide mounted for sliding movement thereon, means for removably mounting the slideway members with the tool slides on the upright wall for movement of the slides toward and from the work station, a barrel cam for each slide each mounted on an independent separate bearing pin mounted in the bed to the rear of the front wall, means connecting the cams to the respective slides for operating them in a direction parallel to the axes of the cams, a drive shaft mounted in the bed to the rear of the upright wall, and a driving connection from the shaft to each cam including a gear secured to each cam and a pinion meshing with the gear, each pinion including means for clamping it in different angular positions on the shaft for angular adjustment on the shaft about its axis.

3. In a wire or ribbon metal forming machine, a bed having an upright front wall, a form bracket adapted for mounting a form on which an article may be formed, said front wall provided with an opening in which the form bracket is set and mounted, forming slides mounted on said front wall adapted to carry forming tools and movable toward and from the form bracket for cooperation with a form mounted thereon, a barrel cam connected with each of the slides to operate them, each cam mounted to rotate on a separate independent pin mounted in the bed to the rear of said upright front wall, a driving connection from each cam to its respective slide arranged to shift the slide in a direction parallel to the axis of the cam, a drive shaft mounted in the bed to the rear of the front wall, and independent and separate driving connections from the shaft to the individual cams including a gear mounted on each cam and a pinion driven by the shaft meshing therewith, and each pinion including clamping means mounting it on its shaft for independent angular adjustment about the shaft to different angular positions thereon.

4. In a wire or ribbon metal forming machine, a bed having an upright front wall provided with an opening, a form bracket mounted in the opening, forming slides mounted on the front of said upright wall for movement toward and from said form bracket for cooperation with a form mounted thereon, a drive shaft mounted in the bed to the rear of said upright wall, a barrel cam connected with each of the slides for operating it and located to the rear of said upright front wall and each mounted to rotate on a separate individual bearing pin, separate and individual driving connections from the shaft to the cams including a gear mounted on one end of each cam and a pinion driven by the shaft meshing therewith, each pinion including clamping means mounting it for individual angular adjustment about its axis, a driving connection from each cam to its respective slide arranged to shift the slide in a direction parallel to the axis of the cam, a cam shaft mounted to the rear of the upright wall, a driving connection from the drive shaft to the cam shaft, a form mounted in the bracket for movement to and from an operative position in the bracket, a cam mounted on the cam shaft, and an operative connection from said latter cam to the form to shift it in timed relation to operation of the forming slides.

5. A feed mechanism for a wire or ribbon metal forming machine comprising a bed, a drive shaft mounted in the bed, said feed mechanism for feeding a wire or ribbon to the machine comprising a complete self-contained feed unit capable of being mounted as such on the bed, said unit comprising a feed bracket including means for securing it to one end of the bed, a guide mounted on the bracket, a feed slide mounted on the guide for movement toward and from the machine, a pivoted bar mounted parallel to the guide to turn about its axis and provided with a longitudinal guide means, a releasable feed grip mounted on the feed slide, an operative connection from said guide means to the feed grip mounted on the feed slide, means for shifting the feed slide including a pivoted lever connected to the slide, a crank shaft, a crank on the shaft connected to the lever, a feed shaft mounted on the bracket, a separate and individual gear drive for connecting the feed shaft to the drive shaft, a driving connection from the feed shaft to the crank shaft, a cam on the crank shaft, a level connected to the pivoted bar for rocking it to control operation of the feed grip, and an operative connection from the cam to said latter lever.

6. A feed mechanism for a wire or ribbon metal forming machine comprising a bed, a drive shaft mounted in the bed, said feed mechanism for feeding wire or ribbon to said machine comprising a complete self-contained feed unit capable of being mounted as such on one end of the bed and comprising a feed bracket including means for detachably connecting it to the bed, a guide mounted on the bracket, a feed slide mounted on the guide for movement toward and from the machine, a guide and feed grip for the wire or ribbon mounted on the slide, a check grip mounted on the bracket at the forward end of the guide including a releasable gripping means for the wire or ribbon, a feed shaft mounted on the bracket, an independent and separate gear drive for connecting the feed shaft with the drive shaft, a lever connected to the slide for operating it, a crank shaft mounted on the bracket, an operating crank on this shaft connected to the lever, a cam mounted for angular adjustment on the crank shaft about its axis, an operative connection from said cam to the feed grip, a second cam mounted on the first cam for adjustment therewith, an operative connection from the second cam to the check grip, and a gear drive connection from the feed shaft to the crank shaft.

7. A feed mechanism for a wire or ribbon metal forming machine comprising a bed, a drive shaft mounted in the bed, said feed mechanism for feeding wire or ribbon to said machine comprising a complete assembled self-contained feed unit capable of being mounted as such on one end of the bed and comprising a feed bracket including means for detachably connecting it to the bed, feed mechanism mounted on the bracket for feeding the wire or ribbon to the machine comprising a slide and a feed grip on said slide, means for shifting the slide, a check grip for the wire or ribbon mounted on the bracket forwardly of the feed slide, a feed shaft mounted on the bracket, a separate independent gear drive for connecting the feed shaft with the drive shaft, and an operative driving connection from the feed shaft to the feed grip and slide shifting means and the check grip comprising a feed grip cam mounted for angular adjustment on the feed shaft about the axis of the shaft, a check grip cam mounted on the feed grip cam for adjustment therewith, means mounting the check grip cam for angular adjustment on the feed grip cam, and operating connections from the feed grip cam and check grip cam to the feed grip and check grip respectively.

8. In a wire or ribbon metal forming machine, a drive shaft, a feed mechanism for feeding wire or ribbon to said machine comprising a reciprocable slide and a feed grip on said slide, a check grip for said wire or ribbon forwardly of the feed mechanism, a feed shaft, a driving connection from the drive shaft to the feed shaft, a support on the feed shaft, a driving connection from the support to the slide, a feed grip cam mounted for angular adjustment on said support about the axis of the shaft, a check grip cam mounted on the feed grip cam for adjustment therewith, and relative angular adjustment on the feed grip cam, and operative connections from the feed grip cam and the check grip cam to the feed grip and check grip respectively.

References Cited in the file of this patent

UNITED STATES PATENTS

| | | |
|---|---|---|
| 67,865 | Fowler | Aug. 20, 1867 |
| 475,379 | Baker | May 24, 1892 |
| 718,961 | Yeatman | Jan. 20, 1903 |
| 763,195 | Merz | June 21, 1904 |
| 1,106,484 | Young | Aug. 11, 1914 |
| 1,186,928 | Merritt | June 13, 1916 |
| 1,908,367 | Kiwi | May 9, 1933 |
| 1,973,436 | Hjort | Sept. 11, 1934 |
| 1,986,356 | Palucki | Jan. 1, 1935 |
| 2,439,272 | Sholtis et al. | Apr. 6, 1948 |
| 2,547,304 | Broscomb | Apr. 3, 1951 |
| 2,593,514 | Albrecht | Apr. 22, 1952 |
| 2,698,081 | Rice | Dec. 28, 1954 |
| 2,810,573 | Nadel | Oct. 22, 1957 |

FOREIGN PATENTS

| | | |
|---|---|---|
| 318,800 | Germany | Feb. 13, 1950 |